United States Patent
Kihara

(10) Patent No.: US 7,402,930 B2
(45) Date of Patent: Jul. 22, 2008

(54) MAGNETOELECTRIC GENERATOR

(75) Inventor: Nobuhiro Kihara, Tokyo (JP)

(73) Assignee: Mitsubishi Electric Corp., Tokyo (JP)

( * ) Notice: Subject to any disclaimer, the term of this patent is extended or adjusted under 35 U.S.C. 154(b) by 0 days.

(21) Appl. No.: 11/484,650

(22) Filed: Jul. 12, 2006

(65) Prior Publication Data

US 2007/0236093 A1 Oct. 11, 2007

(30) Foreign Application Priority Data

Apr. 7, 2006 (JP) .............................. 2006-106529

(51) Int. Cl.
*H02K 21/12* (2006.01)
(52) U.S. Cl. .............................. 310/156.12; 310/156.26; 310/153
(58) Field of Classification Search ................................. 310/156.12–156.23, 156.26, 153, 74
See application file for complete search history.

(56) References Cited

U.S. PATENT DOCUMENTS

| | | | | | |
|---|---|---|---|---|---|
| 3,663,850 | A | * | 5/1972 | Phelon | ........................ 310/153 |
| 4,146,806 | A | | 3/1979 | Katsumata | |
| 4,219,752 | A | * | 8/1980 | Katou | .................... 310/156.19 |
| 5,627,423 | A | * | 5/1997 | Marioni | .................. 310/156.23 |
| 5,907,206 | A | * | 5/1999 | Shiga et al. | ............. 310/156.05 |
| 5,998,902 | A | | 12/1999 | Sleder, Sr. et al. | |
| 6,172,439 | B1 | * | 1/2001 | Ishizuka | ................. 310/156.27 |
| 6,339,271 | B1 | * | 1/2002 | Noble et al. | .................... 310/74 |
| 7,012,349 | B1 | * | 3/2006 | Walker | .................... 310/156.19 |
| 2006/0103252 | A1 | * | 5/2006 | Yokota | .................... 310/156.26 |

FOREIGN PATENT DOCUMENTS

| | | |
|---|---|---|
| DE | 951022 B | 10/1956 |
| DE | 10238401 A1 | 3/2004 |
| JP | 2003-111325 A | 4/2003 |
| JP | 2005-130548 A | 5/2005 |
| JP | 2006-020494 A | 1/2006 |
| JP | 2006-034056 A | 2/2006 |

* cited by examiner

*Primary Examiner*—Dang D Le
(74) *Attorney, Agent, or Firm*—Sughrue Mion, PLLC

(57) ABSTRACT

A magnetoelectric generator according to the present invention includes: a bowl-shaped flywheel that rotates around an axis of rotation; a permanent magnet unit that is fixed to an inner circumferential wall surface of the flywheel and in which adjacent permanent magnets are linked by means of a linking member; a stator core that is disposed inside the permanent magnet unit and that has a plurality of teeth that project radially outward; and a generating coil that is configured by winding conducting wire onto each of the teeth.

20 Claims, 10 Drawing Sheets

4A

MAGNETOELECTRIC GENERATOR

BACKGROUND OF THE INVENTION

1. Field of the Invention

The present invention relates to a magnetoelectric generator that generates power by electromagnetic induction between a permanent magnet and a generating coil due to rotation of a flywheel.

2. Description of the Related Art

Conventionally magnetoelectric generators are known that include: a bowl-shaped flywheel that rotates around an axis of rotation; a plurality of permanent magnets that are fixed to an inner circumferential wall surface of the flywheel so as to be arranged circumferentially; a stator core that is disposed inside the permanent magnets and that has a plurality of teeth that project radially outward; and a generating coil that is configured by winding conducting wire onto each of the teeth, wherein the plurality of permanent magnets are each disposed so as to be held between an annular bottom portion positioning member and an opening portion positioning member which are disposed on inner circumferential surfaces of the flywheel, and are fixed by pressing the opening portion positioning member against the permanent magnets by crimping crimped portions on an opening edge portion of the flywheel inward (see Patent Literature 1, for example).

[Patent Literature 1]
Japanese Patent Laid-Open No. 2005-130548 (Gazette: p. 8; FIG. 4; FIG. 5)

In the above magnetoelectric generators, one problem has been that many man-hours are required for the mounting of the permanent magnets since it is necessary to insert each of the plurality of permanent magnets into the bottom portion positioning member and hold them there.

In particular, there has been a tendency toward increased output in recent years, and frequencies are being raised by increasing the number of poles of the permanent magnets, and for that reason the number of permanent magnets used in each machine is increasing, and increases in the above man-hours have become a big problem.

SUMMARY OF THE INVENTION

The present invention aims to solve the above problems and an object of the present invention is to provide a magnetoelectric generator in which man-hours required to mount a plurality of permanent magnets to an inner circumferential surface of a flywheel are reduced.

In order to achieve the above object, according to one aspect of the present invention, there is provided a magnetoelectric generator characterized by including: a bowl-shaped flywheel that rotates around an axis of rotation; a permanent magnet unit that is fixed to an inner circumferential wall surface of the flywheel and in which at least two adjacent permanent magnets are linked by means of a linking member; a stator core that is disposed inside the permanent magnet unit and that has a plurality of teeth that project radially outward; and a generating coil that is configured by winding conducting wire onto each of the teeth.

Using a magnetoelectric generator according to the present invention, man-hours required to mount a plurality of permanent magnets to the inner circumferential surface of the flywheel can be reduced.

DETAILED DESCRIPTION OF THE PREFERRED EMBODIMENTS

Figure 1:
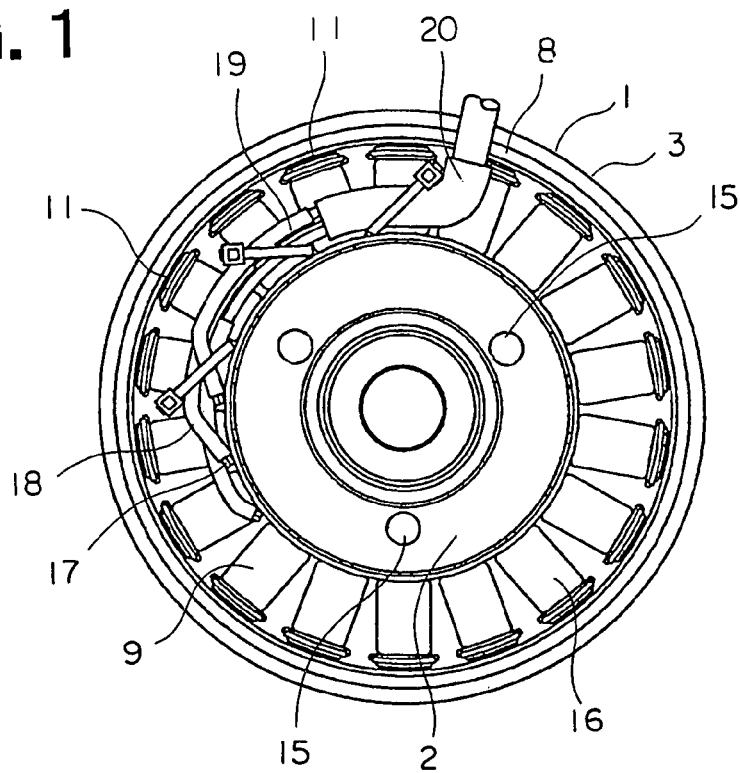
FIG. 1 is a front elevation of a magnetoelectric generator according to Embodiment 1 of the present invention.

Preferred embodiments of the present invention will now be explained based on the drawings, and identical or corresponding members and portions in the drawings will be given identical numbering.

Embodiment 1

Figure 2:
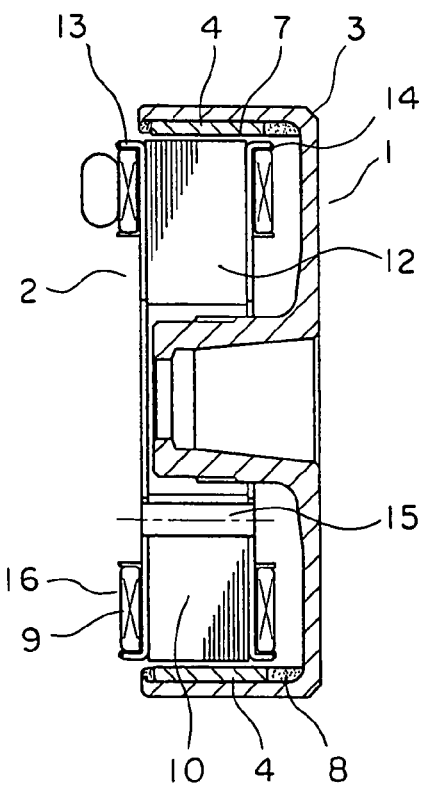
FIG. 2 is a side cross section of FIG. 1.
Figure 3:
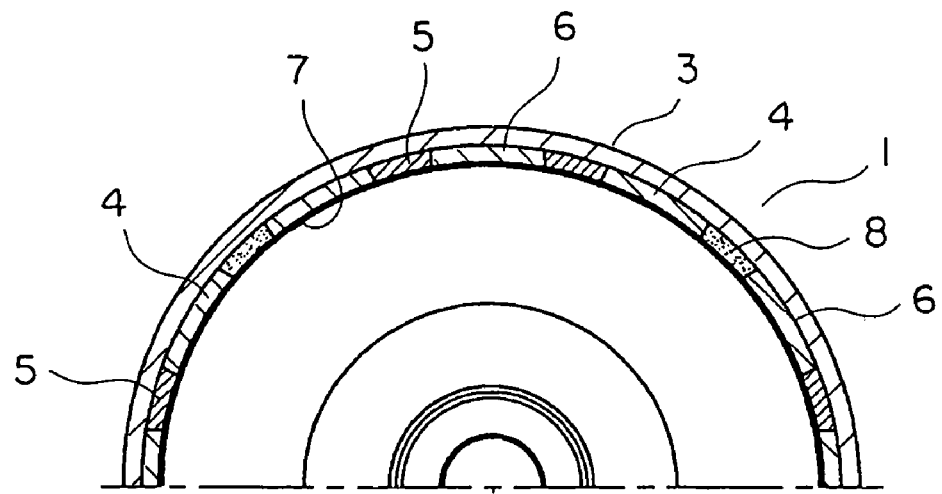
FIG. 3 is a partial front cross section of a rotor from FIG. 1.
Figure 4:
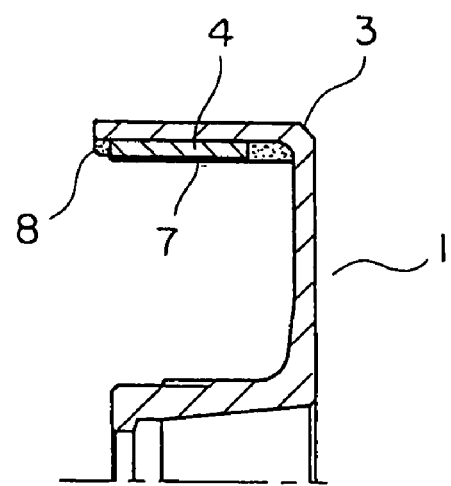
FIG. 4 is a side cross section of FIG. 3.

FIG. 1 is a front elevation of a magnetoelectric generator according to Embodiment 1 of the present invention, FIG. 2 is a side cross section of FIG. 1, FIG. 3 is a partial front cross section of a rotor 1 from FIG. 1, and FIG. 4 is a side cross section of FIG. 3.

This magnetoelectric generator includes: a rotor 1 that is linked to an internal combustion engine; and a stator 2 that is disposed inside the rotor 1 and mounted to a bracket (not shown).

The rotor 1 includes: a bowl-shaped flywheel 3 that is linked to a rotating shaft (not shown) that is driven to rotate by the internal combustion engine; four permanent magnet units 6 that are disposed on an inner circumferential wall surface of the flywheel 3 so as to be spaced apart circumferentially; a tubular protective ring 7 that is closely fitted inside the permanent magnet units 6; and a molded material 8 that integrates and fixes the protective ring 7 and the permanent magnet units 6 to the inner circumferential wall surface of the flywheel 3.

Figure 5:
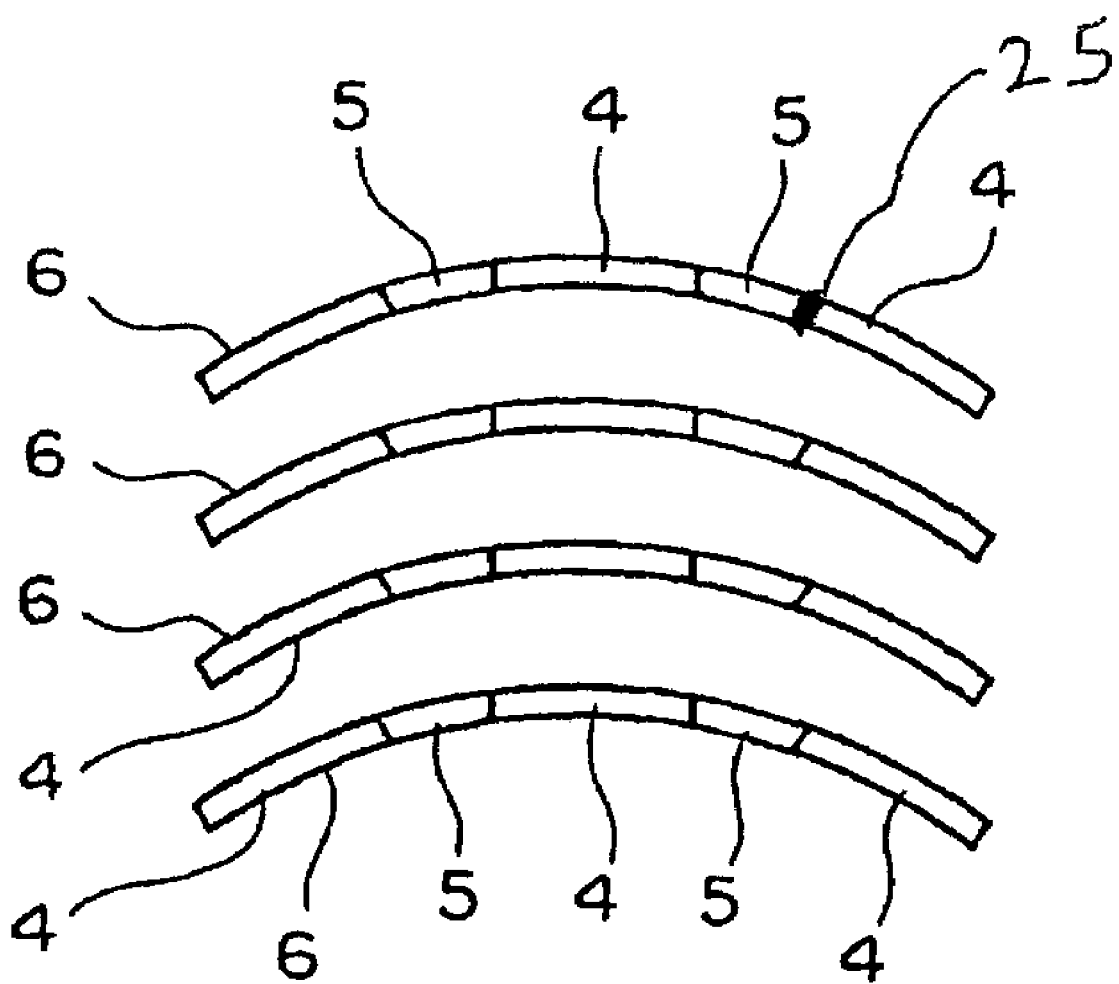
FIG. 5 is a front elevation of permanent magnet units from FIG. 3.

As shown in FIG. 5, the permanent magnet units 6 are arc-shaped, and are constituted by: arc-shaped permanent magnets 4 that are constituted by rare-earth magnets; and arc-shaped linking members 5 that link together adjacent permanent magnets 4. The linking members 5 are constituted by a nonmagnetic epoxy resin, and have two end surfaces that are bonded to end surfaces of the permanent magnets 4 by an adhesive 25. The permanent magnets 4 are arranged in a row such that permanent magnets 4 that have a North-seeking (N) pole on a radially-inner side and a South-seeking (S) pole on a radially-outer side and permanent magnets 4 that have a South-seeking (S) pole on a radially-inner side and a North-seeking (N) pole on a radially-outer side alternate with each other circumferentially. Thus, the plurality of permanent magnets 4 are magnetized such that the adjacent permanent magnets 4 have reverse polarity to each other and a magnetic field that alternately changes in direction is generated in a space on an inner circumferential side of the permanent magnets 4.

The stator 2 includes: a hollow cylindrical stator core 10; and a three-phase generating coil 9. A plurality of teeth 11 that project radially outward in a radial pattern at a uniform pitch circumferentially are formed on an outer circumferential portion of the stator core 10.

The stator core 10 is constituted by: a laminated core 12 that is configured by laminating a large number of open-centered thin magnetic steel plates that are constituted by cold-rolled steel plates parallel to a direction of an axis of rotation; and a first end plate 13 and a second end plate 14 that are respectively stacked in close contact with two end surfaces of the laminated core 12.

The first end plate 13 and the second end plate 14, which are open-centered and constituted by cold-rolled steel plates, have outer circumferential edge portions that are bent toward the generating coil 9 in order to hold the generating coil 9.

Three penetrating apertures 15 that pass through parallel to the axis of rotation are formed on the first end plate 13, the second end plate 14, and the laminated core 12. The laminated core 12, the first end plate 13, and the second end plate 14 are integrated by bolts (not shown) that are passed through the penetrating apertures 15 and nuts (not shown) that are screwed onto end portions of the bolts.

The generating coil 9 is configured by winding conducting wires onto circumferential side surfaces of the teeth 11 of the stator core 10, the conducting wires each having a surface that is enamel-coated, and an epoxy powder-coated insulating material 16 is coated onto the circumferential side surfaces after the conducting wires have been wound.

Output wires 17 of each of the phases of the generating coil 9 that project outward from the stator core 10 are covered by first protective tubes 18. The output wires 17 of each of the phases are electrically connected to respective lead wires 19 that lead out to electrical equipment (not shown) inside the first protective tubes 18. The lead wires 19, which project out tangentially from the stator 2, are covered by a second protective tube 20.

In a magnetoelectric generator having the above configuration, the flywheel 3 rotates interdependently with the rotating shaft that is driven to rotate by the internal combustion engine, and as it does so electric power is generated in the generating coil 9 due to an alternating magnetic field generated by the permanent magnets 4. The resulting alternating-current output is rectified by rectifying diodes (not shown), and is supplied to a load such as a vehicle battery, etc.

In a magnetoelectric generator that has the above configuration, because the permanent magnet units 6 are configured such that three adjacent permanent magnets 4 are linked to each other by means of the linking members 5, mounting work in which twelve permanent magnets 4 are each mounted to the inner circumferential wall surface of the flywheel 3 can be reduced by a factor of three, i.e., from twelve positions to four positions.

The present invention is particularly effective at reducing the man-hours required for mounting the permanent magnets 4 in magnetoelectric generators that include an increased number of permanent magnets 4 that are constituted by rare-earth magnets and separated according to magnetic pole.

Because the linking members 5 are constituted by an epoxy resin in nonmagnetic members, leakage of magnetic flux between the adjacent permanent magnets 4 is reduced compared to when linking members are constituted by a magnetic material, enabling output current to be improved.

Figure 6:
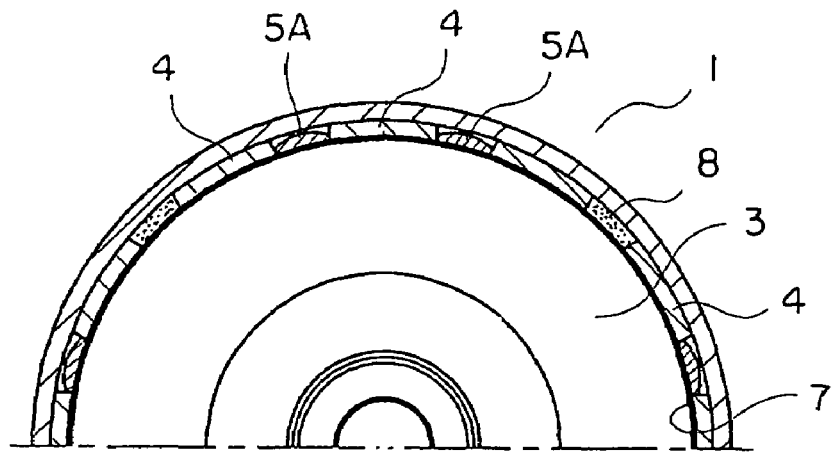
FIG. 6 is a partial front cross section of a variation of the rotor of the magnetoelectric generator according to Embodiment 1.
Figure 7:
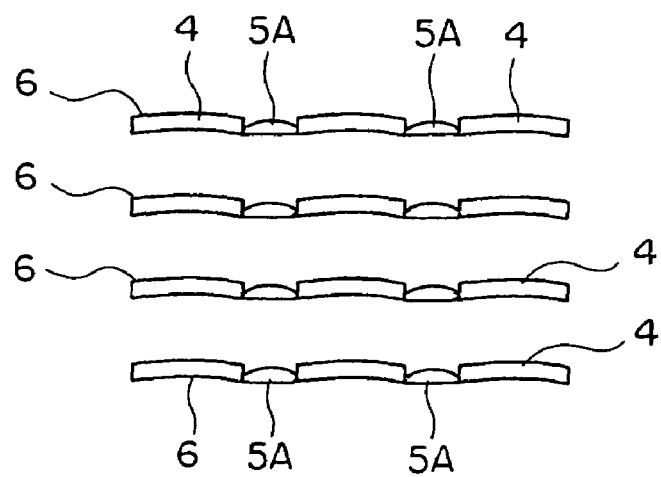
FIG. 7 is a front elevation of permanent magnet units from FIG. 6.

Moreover, as shown in FIGS. 6 and 7, handling when mounting the permanent magnets 4 can be facilitated by configuring the linking members 5A using elastic members, enabling workability of mounting to be improved.

Embodiment 2

Figure 8:
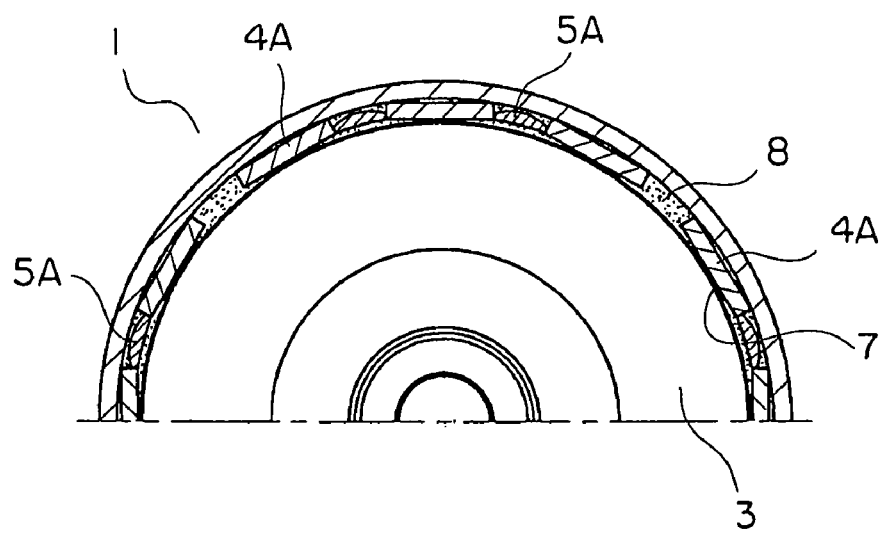
FIG. 8 is a partial front cross section of a rotor of a magnetoelectric generator according to Embodiment 2 of the present invention.

FIG. 8 is a partial front cross section of a rotor 1 of a magnetoelectric generator according to Embodiment 2 of the present invention.

Figure 9:
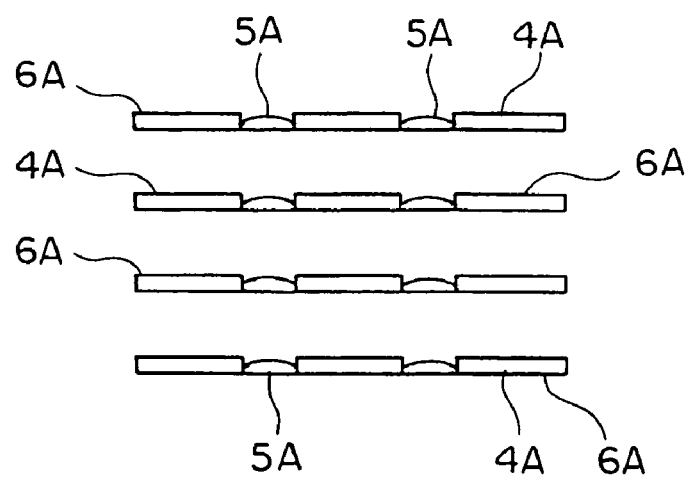
FIG. 9 is a front elevation of permanent magnet units from FIG. 8.

As shown in FIG. 9, in permanent magnet units 6A according to this embodiment, adjacent flat permanent magnets 4A are linked by means of linking members 5A that are constituted by elastic members.

The rest of the configuration is similar to that of the magnetoelectric generator according to Embodiment 1 that is shown in FIG. 6.

Figure 10:
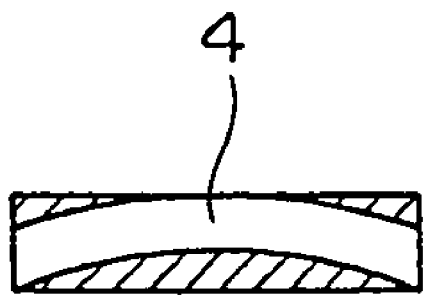
FIG. 10 is an explanatory diagram of the permanent magnets from FIG. 8.
Figure 10:
Figure 10:
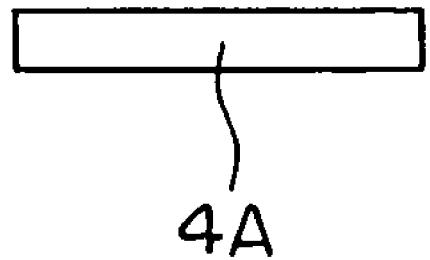

In this embodiment, by changing from the arc-shaped permanent magnets 4 to the flat permanent magnets 4A, as shown in FIG. 10, it is possible to reduce machining man-hours for the magnets and also reduce raw material usage.

Figure 11:
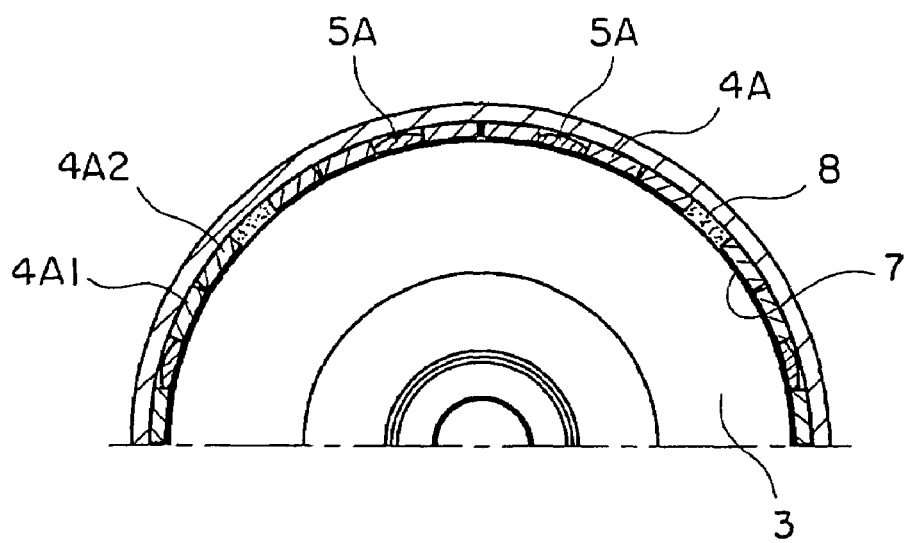
FIG. 11 is a partial front cross section of a variation of the rotor of the magnetoelectric generator according to Embodiment 2.
Figure 12:
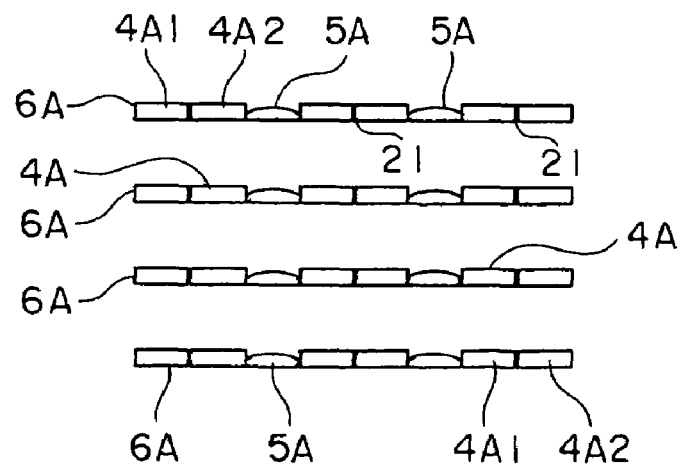
FIG. 12 is a front elevation of permanent magnet units from FIG. 11.

Moreover, as shown in FIGS. 11 and 12, the permanent magnets 4A may also be constituted by pairs of magnet segments 4A1 and 4A2 that are magnetized in similar directions and that are linked flexibly to each other by means of nonmagnetic linking portions 21.

Figure 13:
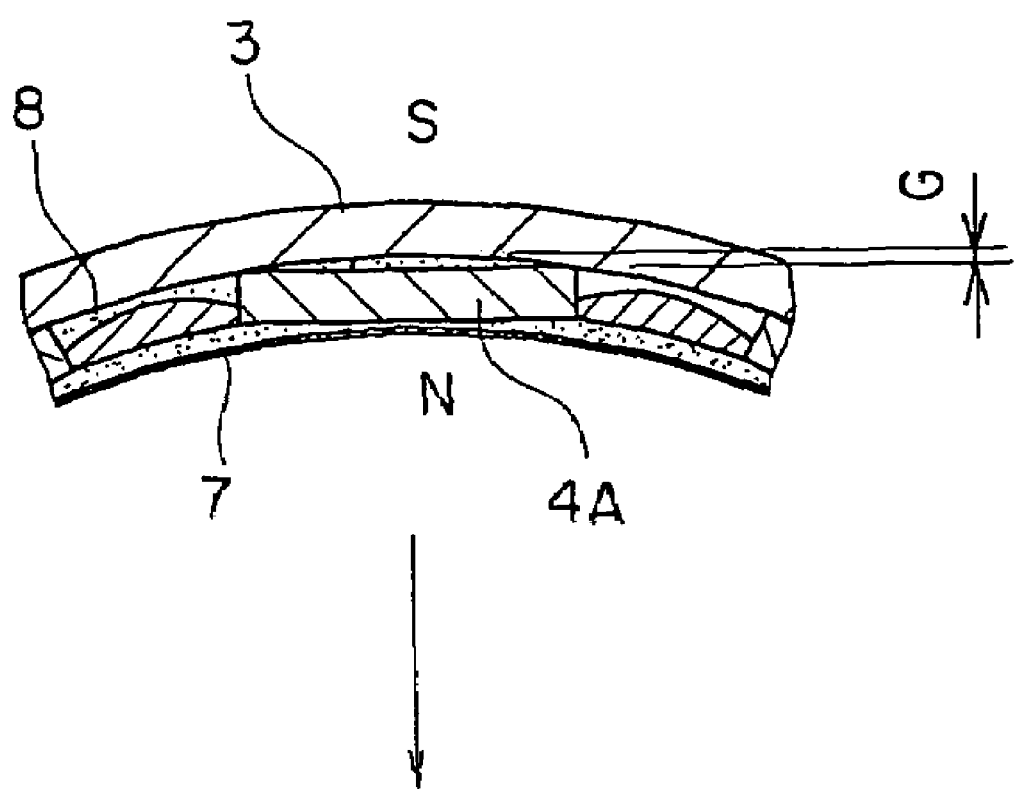
FIG. 13 is an explanatory diagram of the permanent magnets from FIG. 11.
Figure 13:
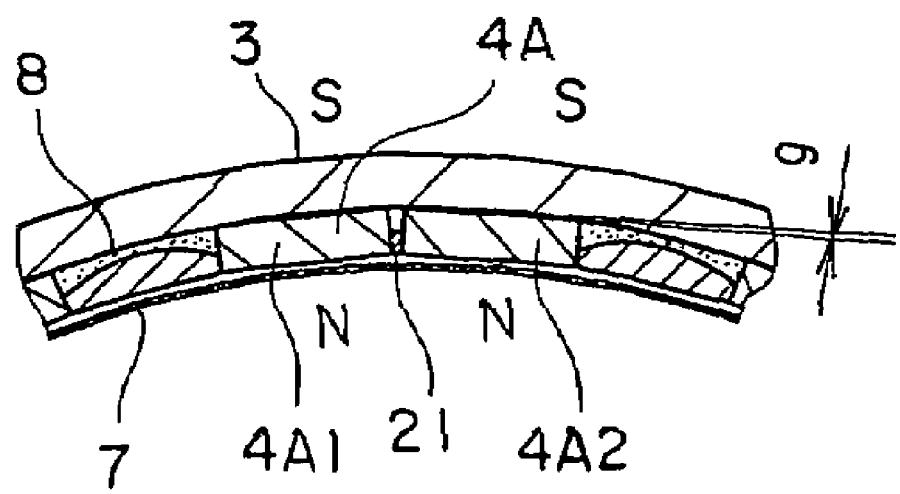

As shown in FIG. 13, by adopting this configuration, gaps G between the flywheel 3 and the permanent magnets 4A can be reduced to smaller gaps g, enabling magnetic loss to be reduced and output current to be improved.

Moreover, rigid permanent magnet units in which a plurality of flat permanent magnets 4A are first connected in a curved shape so as to match the inner circumferential wall surface of the flywheel 3 may also be used.

Embodiment 3

Figure 14:
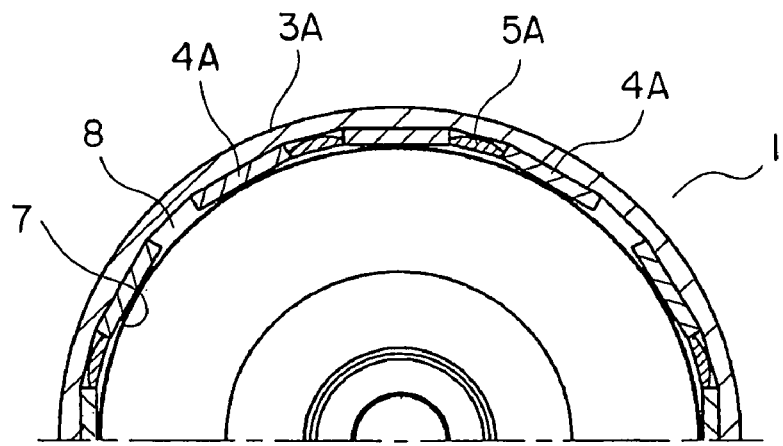
FIG. 14 is a partial front cross section of a rotor of a magnetoelectric generator according to Embodiment 3 of the present invention.
Figure 15:
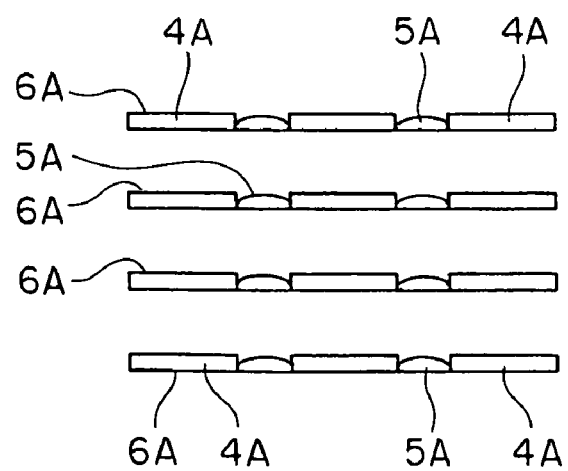
FIG. 15 is a front elevation of permanent magnet units from FIG. 14.

FIG. 14 is a partial front cross section of a rotor 1 of a magnetoelectric generator according to Embodiment 3 of the present invention, and FIG. 15 is a front elevation of permanent magnet units 6A.

An inner circumferential wall surface of a flywheel 3A according to this embodiment has a multifaceted shape that comes into surface contact with the permanent magnets 4A.

The rest of the configuration is similar to that of the magnetoelectric generator according to Embodiment 2 that is shown in FIG. 8.

Figure 16:
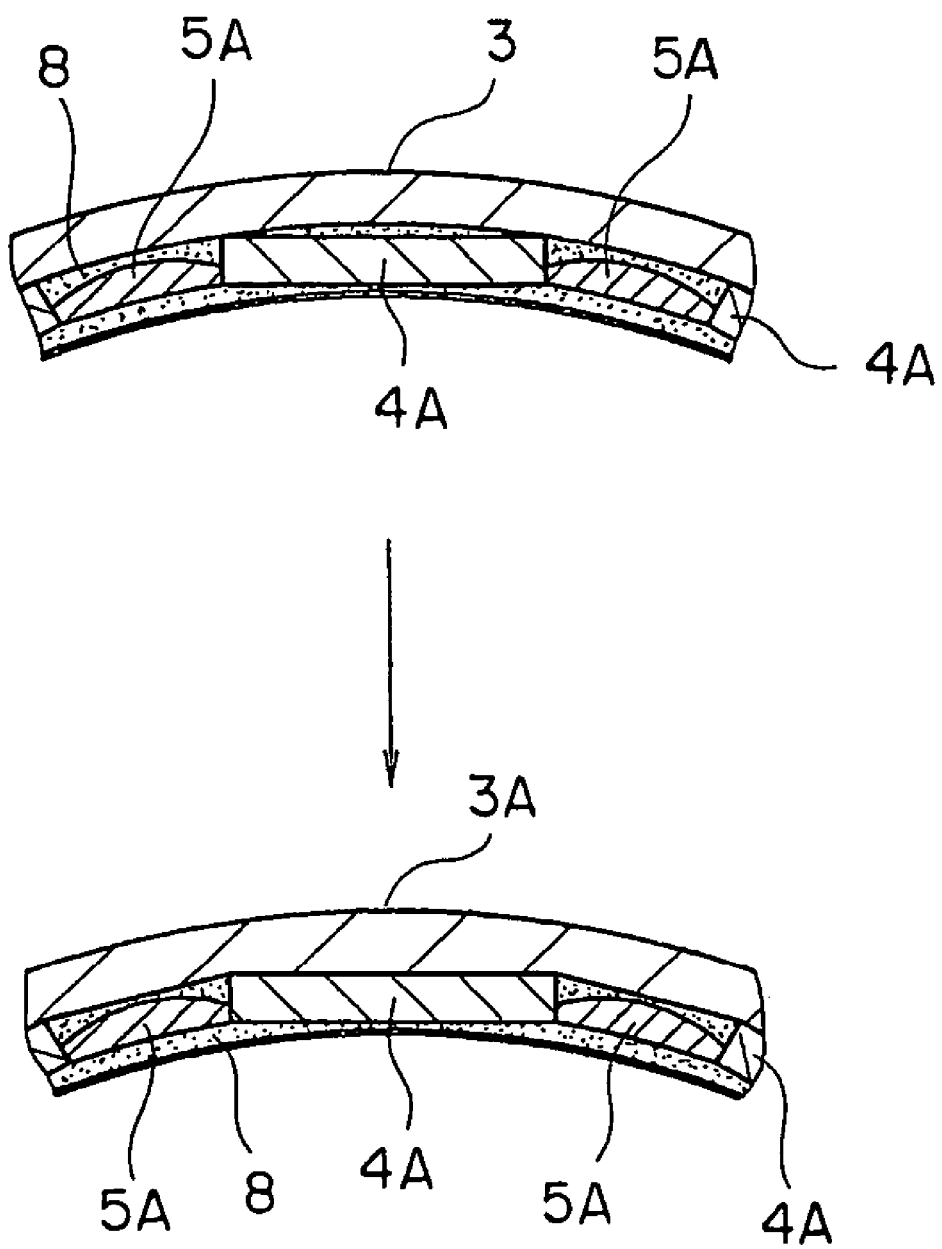
FIG. 16 is an explanatory diagram of the permanent magnets from FIG. 14.

According to this embodiment, as shown in FIG. 16, gaps between the flywheel 3A and the permanent magnets 4A can be eliminated, enabling magnetic loss to be reduced and output current to be improved. The flywheel 3A also functions as a lock to prevent the permanent magnets 4A from turning during rotation.

Moreover, in each of the above embodiments, the permanent magnet units 6 or 6A all have three permanent magnets 4 or 4A, but that is only an example, and two, or four or more, permanent magnets 4 or 4A may also be used. If the number of permanent magnets 4 or 4A is increased, positions requiring mounting work for the permanent magnet units 6 or 6A are reduced proportionately.

The permanent magnets 4 or 4A are not limited to rare-earth magnets, and may also be ferrite magnets, for example.

In each of the above embodiments, the permanent magnet units 6 or 6A are fixed to the flywheel 3, 3A by a molded material 8, but other fixing means may also be used such as fixing the permanent magnet units 6 or 6A by crimping crimped portions that are formed on an opening portion of the flywheel, or bonding the permanent magnet units 6 or 6A to an inner circumferential surface of the flywheel using an adhesive, for example.

What is claimed is:

1. A magnet unit comprising:
   a permanent magnet unit to be mounted on an inner circumferential wall surface of a bowl-shaped flywheel of a magnetoelectric generator, the permanent magnet unit comprising at least two adjacent permanent magnets that are linked to each other by only a linking member, wherein at least one of the two adjacent permanent magnets contacts only one side of the linking member, and
   wherein the magnetoelectric generator comprises:
   the bowl-shaped flywheel that rotates around an axis of rotation;
   the permanent magnet unit mounted on the inner circumferential wall surface of said bowl-shaped flywheel;
   a stator core that is disposed inside said permanent magnet unit and that has a plurality of teeth that project radially outward; and
   a generating coil that is configured by winding conducting wire onto each of said teeth.

2. The magnet unit according to claim 1, wherein said linking member is a nonmagnetic member.

3. The magnet unit according to claim 2, wherein said nonmagnetic linking member comprises epoxy resin.

4. The magnet unit according to claim 1, wherein said linking member is an elastic member.

5. The magnet unit according to claim 1, wherein at least one of said permanent magnets is flat on a side that is fixed to the inner circumferential wall surface of said flywheel.

6. The magnet unit according to claim 5, wherein said inner circumferential wall surface of said flywheel of the magnetoelectric generator has a multifaceted shape that comes into surface contact with said permanent magnets such that the flat side of the at least one of the permanent magnets is entirely covered by the inner circumferential wall surface of said flywheel.

7. The magnet unit according to claim 1, wherein at least one of said permanent magnets is configured such that ends of at least two magnet segments that are magnetized in similar directions are flexibly linked to each other by a non-magnetic linking portion.

8. The magnet unit according to claim 1, wherein said permanent magnet unit is rigid and is configured by connecting said permanent magnets in a curved shape so as to match said inner circumferential wall surface of said flywheel.

9. The magnet unit according to claim 1, wherein at least one of said permanent magnets is a rare-earth magnet.

10. The magnet unit according to claim 1, wherein said linking member has end surfaces that are bonded to end surfaces of said adjacent permanent magnets by an adhesive.

11. The magnet unit according to claim 1, wherein said permanent magnets are magnetized such that adjacent permanent magnets have a reverse polarity to each other.

12. The magnet unit according to claim 1, wherein the linking member is linked to the at least two adjacent permanent magnets by integrating the linking member with the at least two adjacent permanent magnets prior to being mounted on the inner circumferential wall surface of the flywheel.

13. The magnet unit according to claim 1, wherein the permanent magnet unit comprises a first magnet, a second magnet, and a third magnet that are different from each other, and the linking member links the first magnet and the second magnet, and a second linking member links the second magnet and the third magnet, wherein the linking member and the second linking member are only connected to each other via the second magnet.

14. The magnet unit according to claim 1, wherein the linking member is a first linking member, wherein the magnet unit further comprises a second linking member, and wherein the first and second linking members are independent and separate from each other.

15. A magnet unit comprising:
    a permanent magnet unit to be mounted on an inner circumferential wall surface of a bowl-shaped flywheel of a magnetoelectric generator, the permanent magnet unit comprising at least two adjacent permanent magnets and a linking means for linking said two adjacent permanent magnets to each other by only said linking means, wherein at least one of the two adjacent permanent magnets contacts only one side of the linking means, and
    wherein the magnetoelectric generator comprises:
    the bowl-shaped flywheel that rotates around an axis of rotation;
    the permanent magnet unit mounted on the inner circumferential wall surface of said bowl-shaped flywheel;
    a stator core that is disposed inside said permanent magnet unit and that has a plurality of teeth that project radially outward; and
    a generating coil that is configured by winding conducting wire onto each of said teeth.

16. The magnet unit according to claim 15, wherein the linking means directly connects the two adjacent permanent magnets to each other in a final assembly of the magnetoelectric generator.

17. The magnet unit according to claim 15, wherein the linking means has two end surfaces that are bonded to end surfaces of the two adjacent permanent magnets by an adhesive.

18. The magnet unit according to claim 15, wherein the linking means and the two adjacent magnets are firmly fixed to each other forming a permanent magnet unit and wherein the formed permanent magnet unit is fixed to the inner circumferential wall surface of said flywheel.

19. The magnet unit according to claim 15, wherein the linking means is linked to the at least two adjacent permanent magnets by integrating the linking means with the at least two adjacent permanent magnets prior to being mounted on the inner circumferential wall surface of the flywheel.

20. The magnet unit according to claim 15, wherein the permanent magnet unit comprises a first magnet, a second magnet, and a third magnet that are different from each other, and the linking means links the first magnet and the second magnet, and a second linking member links the second magnet and the third magnet, wherein the linking means and the second linking means are only connected to each other via the second magnet.

* * * * *